US011468892B2

(12) United States Patent
Lim et al.

(10) Patent No.: US 11,468,892 B2
(45) Date of Patent: Oct. 11, 2022

(54) ELECTRONIC APPARATUS AND METHOD FOR CONTROLLING ELECTRONIC APPARATUS

(71) Applicant: Samsung Electronics Co., Ltd., Suwon-si (KR)

(72) Inventors: Hyeontaek Lim, Suwon-si (KR); Sejin Kwak, Suwon-si (KR); Youngjin Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 161 days.

(21) Appl. No.: 17/004,474

(22) Filed: Aug. 27, 2020

(65) Prior Publication Data

US 2021/0110821 A1    Apr. 15, 2021

(30) Foreign Application Priority Data

Oct. 10, 2019   (KR) ........................ 10-2019-0125172

(51) Int. Cl.
*G10L 15/22* (2006.01)
*G10L 13/00* (2006.01)
(Continued)

(52) U.S. Cl.
CPC .............. *G10L 15/22* (2013.01); *G06F 3/167* (2013.01); *G06V 20/10* (2022.01); *G06V 40/10* (2022.01);
(Continued)

(58) Field of Classification Search
CPC ....... G10L 15/183; G10L 15/24; G10L 15/07; G10L 15/14; G10L 15/26; G10L 21/0232;
(Continued)

(56) References Cited

U.S. PATENT DOCUMENTS 9,514,751 B2    12/2016   Kim
10,019,990 B2   7/2018    Li et al.
(Continued)

FOREIGN PATENT DOCUMENTS

CN    106503275 A    3/2017
CN    109376225 A    2/2019
(Continued)

OTHER PUBLICATIONS

Search Report and Written Opinion dated Dec. 14, 2020, issued in International Application No. PCT/KR2020/012198.

*Primary Examiner* — Daniel C Washburn
*Assistant Examiner* — Athar N Pasha
(74) *Attorney, Agent, or Firm* — Jefferson IP Law, LLP

(57) ABSTRACT

An electronic apparatus and a control method thereof are provided. The electronic apparatus includes a microphone, a camera, a memory storing an instruction, and a processor configured to control the electronic apparatus coupled with the microphone, the camera and the memory, and the processor is configured to, by executing the instruction, obtain a user image by photographing a user through the camera, obtain the user information based on the user image, and based on a user speech being input from the user through the microphone, recognize the user speech by using a speech recognition model corresponding to the user information among a plurality of speech recognition models.

8 Claims, 8 Drawing Sheets

(51) Int. Cl.
  *G10L 15/183* (2013.01)
  *G10L 21/0232* (2013.01)
  *G10L 15/18* (2013.01)
  *G10L 15/24* (2013.01)
  *G06F 3/16* (2006.01)
  *G06V 20/10* (2022.01)
  *G06V 40/10* (2022.01)
  *G10L 15/08* (2006.01)

(52) U.S. Cl.
  CPC ............ *G10L 13/00* (2013.01); *G10L 15/183* (2013.01); *G10L 15/1815* (2013.01); *G10L 15/24* (2013.01); *G10L 21/0232* (2013.01); *G10L 2015/088* (2013.01); *G10L 2015/223* (2013.01)

(58) Field of Classification Search
  CPC ........... G10L 21/0208; G10L 2015/088; G10L 2015/223; G10L 2015/227; G10L 13/033; G10L 13/08; G10L 15/22; G10L 13/00; G10L 15/1815; G10L 17/24; G06T 7/11; G06T 7/24; G06F 3/167; G06V 20/10; G06V 40/10
  See application file for complete search history.

(56) References Cited

U.S. PATENT DOCUMENTS

| | | | |
|---|---|---|---|
| 10,140,362 | B2 | 11/2018 | Moreno Mengibar et al. |
| 11,069,355 | B2 | 7/2021 | Lee |
| 11,227,592 | B1* | 1/2022 | Kockerbeck ........ G10L 15/1815 |
| 2012/0148117 | A1* | 6/2012 | Chang .................... G06V 40/50 382/118 |
| 2015/0081288 | A1 | 3/2015 | Kim |
| 2016/0140964 | A1* | 5/2016 | Connell, II ............. G10L 15/25 704/231 |
| 2016/0150124 | A1* | 5/2016 | Panda ................... G06F 3/1204 358/1.14 |
| 2016/0267913 | A1* | 9/2016 | Kim ........................ G10L 15/22 |
| 2018/0053518 | A1* | 2/2018 | Chrisman ........... G10L 21/0208 |
| 2018/0090140 | A1 | 3/2018 | Georges et al. |
| 2019/0130904 | A1* | 5/2019 | Homma .................. G10L 15/26 |
| 2019/0325864 | A1* | 10/2019 | Anders ................... G10L 15/22 |
| 2019/0377521 | A1* | 12/2019 | Tokuchi ................ G06F 3/1206 |
| 2020/0035235 | A1 | 1/2020 | Lee |
| 2020/0051554 | A1 | 2/2020 | Kim et al. |
| 2020/0211540 | A1* | 7/2020 | MacConnell ........... G10L 15/16 |
| 2021/0081749 | A1* | 3/2021 | Claire .................... G06N 3/004 |
| 2021/0182913 | A1* | 6/2021 | Hwang .............. G06Q 30/0256 |
| 2021/0264931 | A1* | 8/2021 | Leider ..................... G10L 15/26 |
| 2021/0304763 | A1 | 9/2021 | Lee |

FOREIGN PATENT DOCUMENTS

| | | |
|---|---|---|
| CN | 109524020 A | 3/2019 |
| JP | H11-95789 A | 4/1999 |
| KR | 10-2010-0003672 A | 1/2010 |
| KR | 10-2015-0031896 A | 3/2015 |
| KR | 10-2017-0105727 A | 9/2017 |
| KR | 10-2018-0040865 A | 4/2018 |
| KR | 10-2018-0084392 A | 7/2018 |
| KR | 10-2018-0127890 A | 11/2018 |
| KR | 10-2019-0106011 A | 9/2019 |
| KR | 10-2025566 B1 | 9/2019 |

* cited by examiner

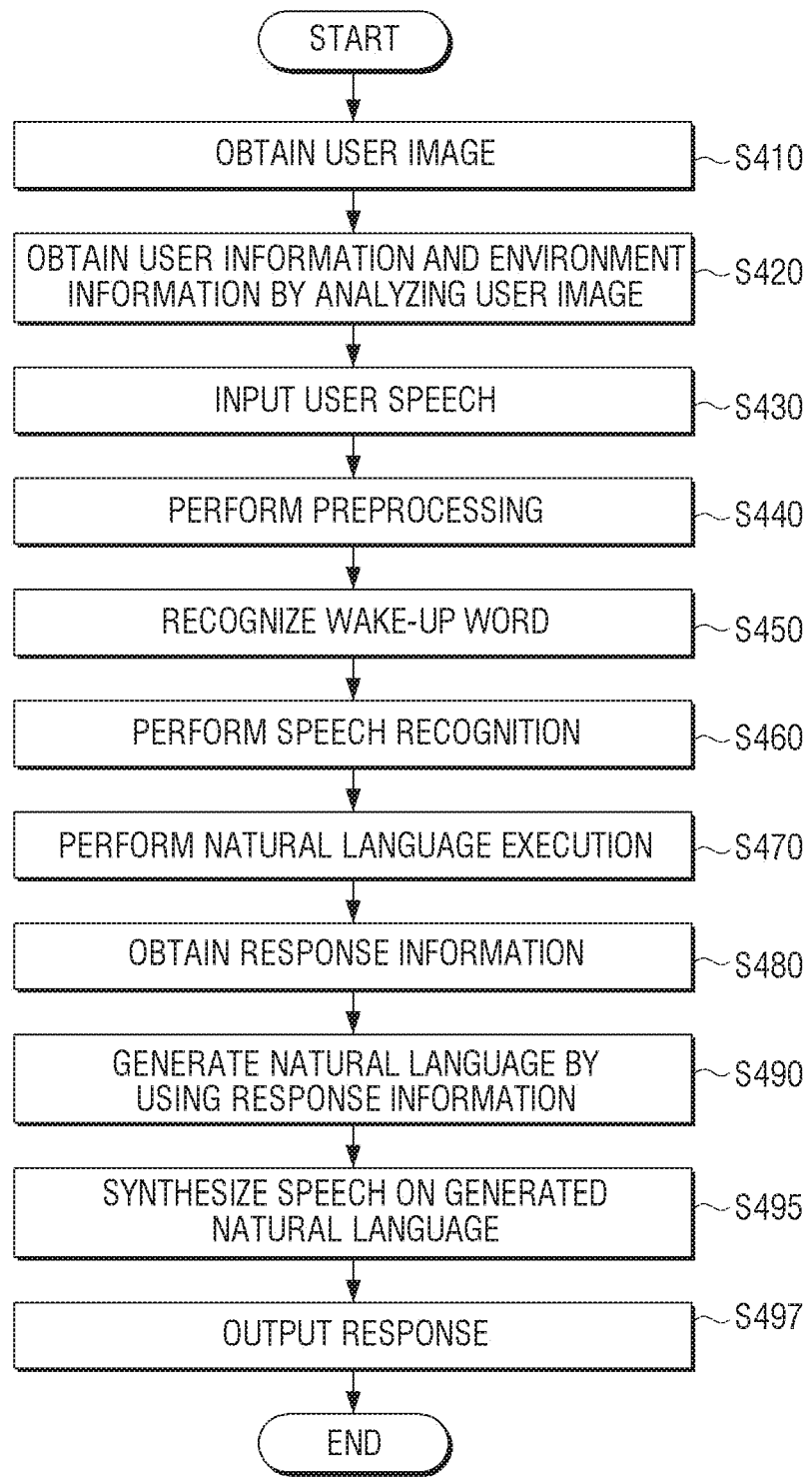

ELECTRONIC APPARATUS AND METHOD FOR CONTROLLING ELECTRONIC APPARATUS

CROSS-REFERENCE TO RELATED APPLICATION(S)

This application is based on and claims priority under 35 U.S.C. § 119(a) of a Korean patent application number 10-2019-0125172, filed on Oct. 10, 2019, in the Korean Intellectual Property Office, the disclosure of which is incorporated by reference herein in its entirety.

BACKGROUND

1. Field

The disclosure relates to an electronic apparatus and a method for controlling the electronic apparatus. More particularly, the disclosure relates to an electronic apparatus capable of providing a response to a user speech by recognizing the user speech and a method for controlling the electronic apparatus.

2. Description of Related Art

In recent years, artificial intelligence systems have been employed in various fields. Unlike existing rule-based smart systems, the artificial intelligence systems are machines that learn and judge themselves. The more the artificial intelligence system is used, recognition rate improves and user preference is more accurately understood. Thus, existing rule based smart systems are gradually being replaced with deep learning based artificial intelligence systems.

In particular, recently, an artificial intelligence personal assistant system (or dialogue system) capable of providing a response to a user speech or controlling an electronic apparatus based on the user speech is being developed by using the artificial intelligence system.

The artificial intelligence personal assistance system described above includes various neural network models such as a speech recognition module for recognizing user speech, a natural language understanding module for understanding user speech, a text to speech (TTS) for outputting the generated response in speech data format, and the like.

However, because a plurality of neural network models included in the artificial intelligence personal assistant system of the related art is generically trained, there are many constraints to usability. That is, because a response to a user speech is provided by using a speech recognition module, a natural language understanding module, a TTS module and the like which does not consider user characteristics, there has been problems such as providing a response the context of which is not desired by the user or providing a response in a manner not suitable to the user.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic apparatus and a method for controlling the electronic apparatus.

Additional aspects will be set forth in part in the description which follows and, in part, will be apparent from the description, or may be learned by practice of the presented embodiments.

In accordance with an aspect of the disclosure, an electronic apparatus is provided. The electronic apparatus includes a microphone, a camera, a memory storing an instruction, and a processor configured to control the electronic apparatus by being coupled to the microphone, the camera and the memory, and the processor is configured to, by executing the instruction, obtain a user image by photographing a user through the camera, obtain the user information based on the user image, and based on a user speech being input from the user through the microphone, recognize the user speech by using a speech recognition model corresponding to the user information among a plurality of speech recognition models.

In accordance with another aspect of the disclosure, a control method of an electronic apparatus is provided. The control method includes obtaining a user image by photographing a user through a camera, obtaining information on the user based on the user image, and based on a user speech being input from the user through the microphone, recognizing the user speech by using a speech recognition model corresponding to the user information among a plurality of speech recognition models.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features and advantages of certain embodiments of the disclosure will be more apparent from the following description taken in conjunction with the accompanying drawings, in which:

FIG. 4 is a diagram illustrating a method for providing a user speech by obtaining a user information based on a user image and selecting a neural network model of a dialogue system based on the obtained user information according to an embodiment of the disclosure;

Throughout the drawings, like reference numerals will be understood to refer to like parts, components, and structures.

DETAILED DESCRIPTION

Figure 1:
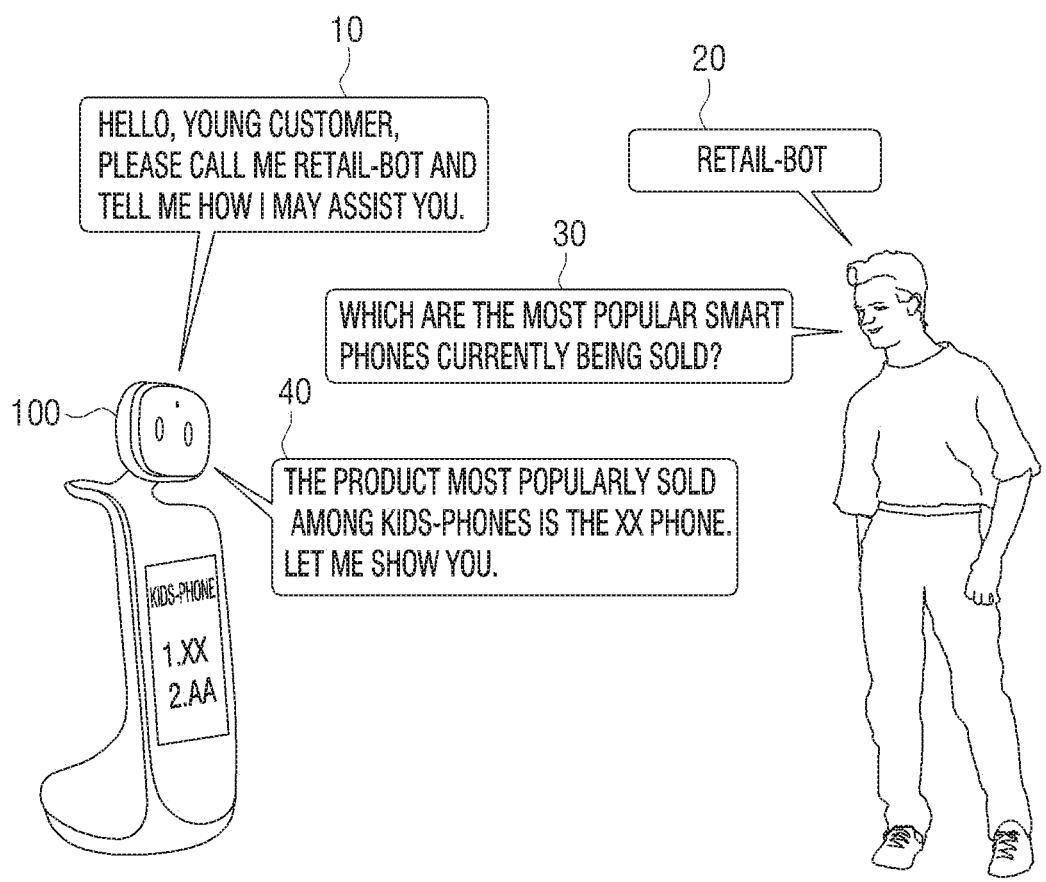
FIG. 1 is a diagram illustrating an embodiment of providing a response to a user by selecting a neural network model comprised in a dialogue system based on a user information according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure, expressions such as "comprise," "may comprise," "consist of," "may consist of," or the like are used to designate a presence of a corresponding characteristic (e.g., elements such as numerical value, function, operation, or component, etc.), and not to preclude a presence or a possibility of additional characteristics.

In the disclosure, expressions such as "A or B," "at least one of A and/or B," or "one or more of A and/or B" should be understood to include all possible combinations of the items listed together. For example, "A or B," "at least one of A and B," or "at least one of A or B" should be understood to represent all cases including (1) at least one of A, (2) at least one of B, or (3) at least one of A and at least one of B.

The expressions such as "first," "second," "1st," or "2nd" used herein may denote various elements, regardless of order and/or importance, and may be used to distinguish one element from another, without limiting the corresponding elements. For example, a first user device and a second user device may indicate the different user devices, regardless of order and importance. For example, a first element may be denoted as a second element, and similarly a second element may also be denoted as a first element without departing from the scope of the disclosure.

The term such as "module," "unit," "part," and so on is used to refer to an element that performs at least one function or operation, and such element may be implemented as hardware or software, or a combination of hardware and software. Further, except for when each of a plurality of "modules," "units," "parts," and the like need to be implemented in an individual hardware, the components may be integrated in at least one module or chip and implemented in at least one processor.

When a certain element (e.g., first element) is indicated as being "(operatively or communicatively) coupled with/to" or "connected to" another element (e.g., second element), it could be understood as the certain element being directly coupled with/to the other element or as being coupled through another element (e.g., third element). On the other hand, when a certain element (e.g., first element) is indicated as "directly coupled with/to" or "connected to" another element (e.g., second element), it could be understood as another element (e.g., third element) not being present between the certain element and the other element.

The expression "configured to . . . (or set up to)" used in the disclosure may be used interchangeably with, for example, "suitable for . . . ," "having the capacity to . . . ," "designed to . . . ," "adapted to . . . ," "made to . . . ," or "capable of . . . " based on circumstance. The term "configured to . . . (or set up to)" may not necessarily mean "specifically designed to" in terms of hardware. Rather, in a certain circumstance, the expression "a device configured to . . . " may mean something that the device "may be configured with . . . " together with another device or components. For example, the phrase "a processor configured to (or set up to) perform A, B, or C" may mean a processor dedicated to perform a corresponding operation (e.g., embedded processor), or a generic-purpose processor (e.g., a central processing unit (CPU) or an application processor (AP)) capable of performing the corresponding operations by executing one or more software programs stored in the memory apparatus.

The terms used herein have merely been used to describe a specific embodiment, and not to limit the scope of another embodiment. A singular expression includes a plural expression, unless otherwise specified. The terms used in the disclosure, including technical or scientific terms, may have the same meaning as the terms generally understood by those of ordinary skill in the related field of art. Of the terms used herein, the terms which are defined in a typical dictionary may be interpreted to meanings identical or similar to the contextual meanings thereof in the related art. Unless clearly defined otherwise, the terms may not be interpreted to ideal or excessively formal meanings. In some cases, even if the term is defined in the disclosure, the terms may not be interpreted to exclude the embodiments of the disclosure.

The disclosure will be described in greater detail below with reference to the accompanying drawings. However, in describing the disclosure, in case it is determined that the detailed description of related known technologies may unnecessarily confuse the gist of the disclosure, the detailed description thereof will be omitted. With respect to the description on the drawings, like reference numerals may be used to indicate like elements.

The disclosure has been devised to solve the above-described problem, and an object of the disclosure lies in providing an electronic apparatus capable of obtaining a user information based on a user image and providing a response to a user speech by using a trained neural network model corresponding to the obtained user information, and a control method thereof.

The disclosure will be described in greater detail below with reference to the accompanying drawings.

FIG. 1 is a diagram illustrating an embodiment of providing a response to a user by selecting a neural network model comprised in a dialogue system based on a user information according to an embodiment of the disclosure.

Referring to FIG. 1, the electronic apparatus according to an embodiment may be a robot, but this is merely one embodiment, and may be implemented as a portable terminal such as, for example, and without limitation, a smart phone, tablet personal computer (PC), and the like or a home appliance product or the like such as, for example, and without limitation, a television (TV), a refrigerator, a washer, and the like. The electronic apparatus 100 may include a camera for photographing a user and a microphone for receiving input of a user speech, but this is merely one embodiment, and may be coupled with an external camera and an external microphone.

The electronic apparatus 100 may obtain a user image by photographing the user through the camera. If the electronic apparatus 100 is implemented as a robot and if the user is approaching in the direction of the electronic apparatus 100, the electronic apparatus 100 may detect a proximity of the user by using a sensor. When the user is detected as being in close proximity, the electronic apparatus 100 may obtain a user image by photographing the user. The user image may not only include the user, but also an object (e.g., furniture, home appliance product, etc.) included in the environment the electronic apparatus 100 is located.

The electronic apparatus 100 may obtain a user information based on the obtained user image. In an embodiment, the electronic apparatus 100 may obtain user information by inputting a user image to an object recognition model trained to recognize an object. In another embodiment, the electronic apparatus 100 may identify whether a user is a registered user based on a specific body part (e.g., iris, face, etc.) included in the user image. If identified as a registered user, the electronic apparatus 100 may obtain the registered user information. The user information may include information on an age group, gender, disabilities of the user.

In addition, the electronic apparatus 100 may analyze the user image and obtain environment information based on information on an object other than the user included in the user image. The environment information may be information on an environment the user is located, and may include information on a place the user is located, and information on an object included in the place the user is located.

When user information is obtained, the electronic apparatus 100 may execute a wake-up model corresponding to user information among a plurality of wake-up models. A wake-up word may be a word for executing or loading an artificial intelligence program (e.g., dialogue system) to provide a response to a user speech. The wake-up model, as a neural network model capable of recognizing the wake-up words, may be trained according to user characteristics. For example, the wake-up model may include a first wake-up model trained with a wake-up word uttered by children (e.g., ages 4 to 12), a second wake-up model trained with a wake-up word uttered by adults (ages 13 to 59), and a third wake-up model trained with a wake-up word uttered by seniors (e.g., ages 60 and over). That is, if the recognized user is a child, the electronic apparatus 100 may execute a first wake-up model.

In addition, if a user is detected as being in close proximity, the electronic apparatus 100 may output a guide message 10 guiding on a wake-up word to control the electronic apparatus 100. For example, the electronic apparatus 100 may output a guide message 10 indicating "hello young customer, please call me retail-bot and tell me how I may assist you" as illustrated in FIG. 1. In FIG. 1, the guide message 10 has been output in an auditory form through a speaker, but this is merely one embodiment, and the guide message 10 may be output in a visual form through a display, or output concurrently in the visual form and the auditory form.

If a user utters a wake-up word 20, the electronic apparatus 100 may recognize the wake-up word 20 uttered by the user. For example, if the user utters "retail-bot" as illustrated in FIG. 1, the electronic apparatus 100 may recognize the wake-up word 20 uttered by the user. The electronic apparatus 100 may identify whether the wake-up word 20 is included among the user utterances by using the wake-up model corresponding to the user information of the plurality of wake-up models. For example, if the recognized user is a child, the electronic apparatus 100 may identify whether the wake-up word 20 was included in a speech uttered by the user based on the first wake-up model.

When the wake-up word 20 is recognized, the electronic apparatus 100 may execute models corresponding to the user information among a plurality of models included in the dialogue system. For example, the electronic apparatus 100 may execute a speech recognition model corresponding to the user information of a plurality of speech recognition models, execute a natural language understanding model corresponding to the user information of a plurality of natural language understanding models, and execute a TTS model corresponding to the user information of a plurality of TTS models. The electronic apparatus 100 may execute a plurality of neural network models concurrently, but this is merely one embodiment, and may also execute the plurality of neural network models sequentially.

The electronic apparatus 100 may receive input of an audio signal included with a user speech uttered by the user through the microphone. For example, the user speech 30 may be a speech asking, "which are the most popular smart phones currently being sold?" The electronic apparatus 100 may detect a user speech section from the audio signal which includes the user speech 30.

The electronic apparatus 100 may perform a preprocessing on the user speech 30. The electronic apparatus 100 may perform preprocessing on a speech signal included with a user speech based on an environment information and a user information. Specifically, the electronic apparatus 100 may perform preprocessing by identifying a preprocessing filter for removing noise included in the speech signal based on the environment information. In addition, the electronic apparatus 100 may perform preprocessing by identifying a parameter for enhancing user speech included in the speech signal based on the user information.

When preprocessing is performed, the electronic apparatus may perform a speech recognition on the user speech 30. Specifically, the electronic apparatus 100 may obtain a text corresponding to the user speech 30 by performing speech recognition on the user speech 30 through a speech recognition model corresponding to user information of a plurality of speech recognition models. Specifically, the electronic apparatus 100 may store a plurality of speech recognition models trained for each user characteristic (e.g., per age, per gender, whether or not there is disability, etc.), and perform speech recognition on the user speech 30 by using the speech recognition model corresponding to user information of the plurality of speech recognition models. For example, the electronic apparatus 100 may perform speech recognition on the user speech 30 by using the speech recognition model trained based on the speech of a child.

When the text is obtained through the speech recognition model corresponding to the user information, the electronic apparatus 100 may perform a natural language understanding based on the obtained text. The electronic apparatus 100 may perform a natural language understanding on the obtained text by using a natural language understanding model corresponding to the user information of a plurality of natural language understanding models trained for each user characteristic, and may obtain an intent of the user speech and a slot for performing the intent as a performance result. The electronic apparatus 100 may perform the natural language understanding on the user speech 30 by using the natural language understanding model trained based on the text frequently uttered by children.

When the intent and slot of the user speech 30 is obtained, the electronic apparatus 100 may obtain a response information on the user speech 30 based on the intent and slot of the user speech 30. The electronic apparatus 100 may obtain the response information on the user speech 30 by using a knowledge database (DB) corresponding to information on the user information. For example, the electronic apparatus 100 may obtain the response information on the user speech 30 by using the knowledge DB corresponding to a child.

When the response information on the user speech 30 is obtained, the electronic apparatus 100 may generate a natural language based on the response information. The electronic apparatus 100 may generate a response in a form of a natural language by using a natural language generating model corresponding to user information of the plurality of natural language generating models. For example, the electronic apparatus 100 may generate a response in the form of the natural language of, "The product most popularly sold among kids-phones is the XX phone. Let me show you."

The electronic apparatus 100 may perform a text to speech (TTS) operation to output a response in the form of a natural language to a speech data. The electronic apparatus 100 may generate a response in the form of a natural language to a speech data by using a TTS model corresponding to the user information of a plurality of TTS models. For example, the electronic apparatus 100 may generate the response in the form of a natural language to speech data by using the TTS model (e.g., a TTS model in a voice of an animation character preferred by a child) corresponding to a child of the plurality of TTS models.

The electronic apparatus 100 may output a response generated in the form of a natural language. Specifically, as illustrated in FIG. 1, the electronic apparatus 100 may, through the speaker, output the response 40 in the form a natural language of, "The product most popularly sold among kids-phones is the XX phone. Let me show you."

In addition, the electronic apparatus 100 may identify an output method on the response information based on the user information. The output method on the response information may include a method of outputting a response information through a display, and a method of outputting the response information through the speaker. For example, if the user is a child, the electronic apparatus 100 may, as illustrated in FIG. 1, provide the response information by using both the method of outputting the response information through the display and the method of outputting the response information through the speaker. However, if the user is an adult, the electronic apparatus 100 may provide the response information by using the method of outputting the response information through the speaker.

The electronic apparatus 100 may store each of a plurality of models included in a dialogue system to provide a response to the user speech, but this is merely one embodiment, and may receive a model corresponding to the user information of the plurality of models from an external server. For example, the electronic apparatus 100 may transmit user information to a server storing the plurality of speech recognition models trained for each user characteristic, and perform speech recognition on the user speech 30 by using a speech recognition model corresponding to user information from the server.

Figure 2:
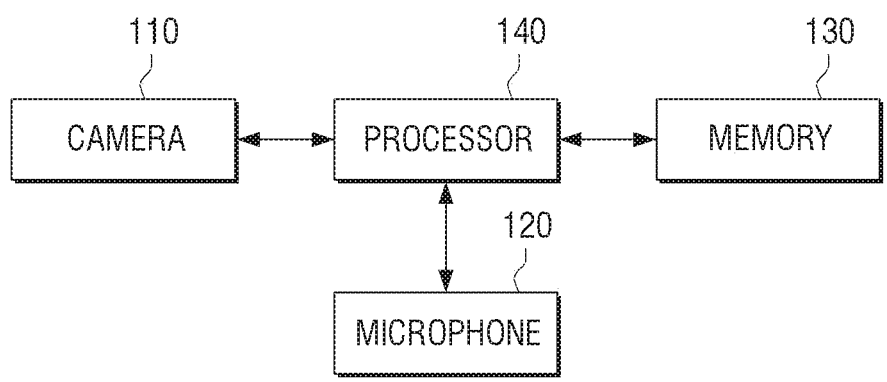
FIG. 2 is a drawing of a block diagram schematically illustrating a configuration of an electronic apparatus according to an embodiment of the disclosure.

FIG. 2 is a drawing of a block diagram schematically illustrating a configuration of an electronic apparatus according to an embodiment of the disclosure.

Referring to FIG. 2, the electronic apparatus 100 may include a camera 110, a microphone 120, a memory 130, and a processor 140. However, the configuration of FIG. 2 is merely one embodiment, and other configurations may be added or some configurations may be omitted according to the embodiment of the electronic apparatus 100.

The camera 110 may obtain a user image by photographing a user through an image sensor. The user image may include not only the user but also an object (e.g., furniture, home appliance, display item, etc.) included in an environment the user is located. In addition, a plurality of cameras may be included in the main body of the electronic apparatus 100, but this is merely one embodiment, and a plurality of cameras may be electrically coupled with the electronic apparatus 100 by being externally located.

The microphone 120 may receive input of an audio signal including the user speech. The microphone 120 may receive an audio signal including a wake-up word (or trigger word) and an audio signal including the user speech for inquiring about a specific information or controlling an apparatus. The microphone 120 may be provided in plurality on the main body of the electronic apparatus 100, but this is merely one embodiment, and may be electrically coupled with the electronic apparatus 100 by being externally located.

Figure 3:
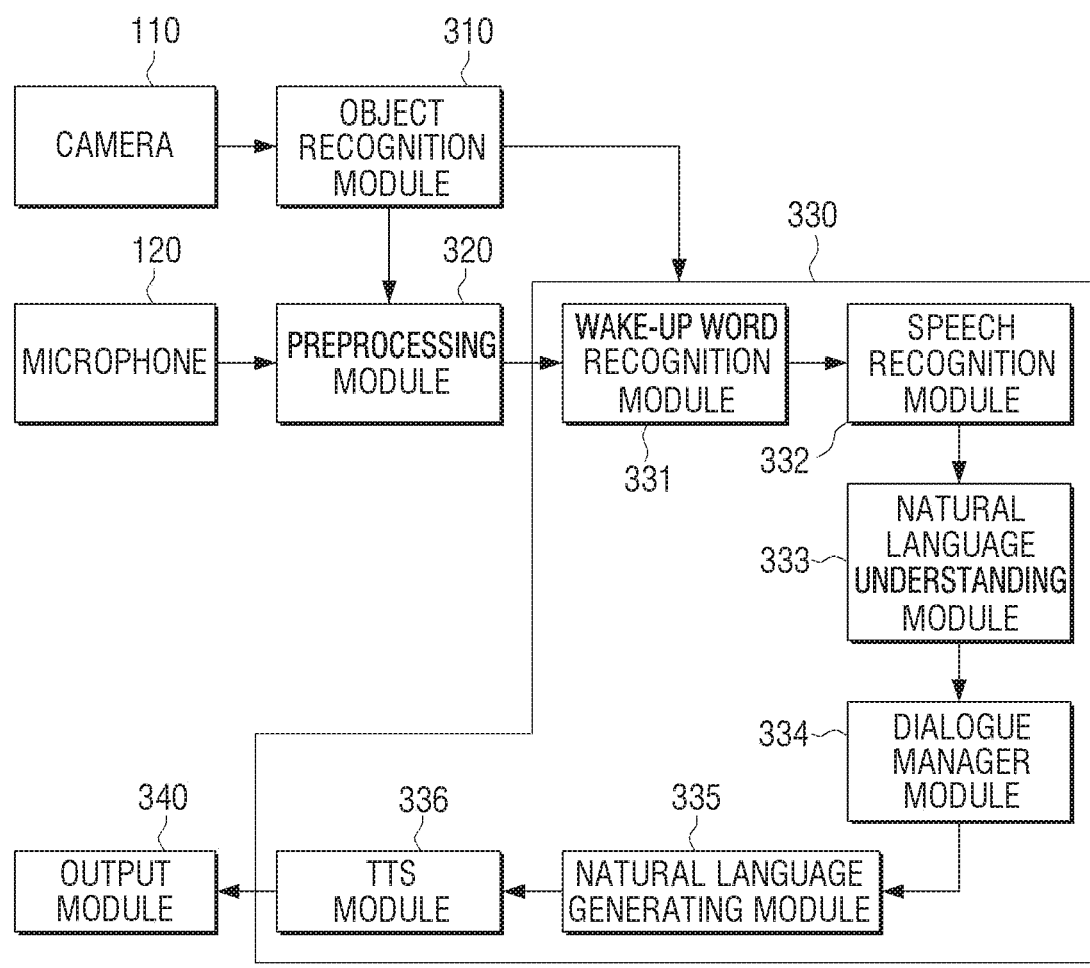
FIG. 3 is a drawing illustrating a block diagram comprising a configuration for providing a response to a user speech according to an embodiment of the disclosure.

The memory 130 may store at least one instruction or data related to another element of the electronic apparatus 100. Specifically, the memory 130 may include a non-volatile memory and a volatile memory, and may, for example, be implemented as a flash-memory, a hard disk drive (HDD), a solid state drive (SSD), or the like. The memory 130 may be accessed by the processor 140, and reading, writing, modifying, deleting, updating, or the like of the data may be performed by the processor 140. In addition, the memory 130 may store an artificial intelligence agent for operating a dialogue system. Specifically, the electronic apparatus 100 may use the artificial intelligence agent to generate a natural language in response to user utterance or obtain a control instruction. The artificial intelligence agent may be a program dedicated to providing an artificial intelligence based service (e.g., a speech recognition server, a personal assistant service, a translation server, a search service, etc.). Specifically, the artificial intelligence agent may be executed by a generic-purpose processor (e.g., CPU) or a separate AI dedicated processor according to the related art (e.g., graphics processing unit (GPU), neural processing unit (NPU), etc.). In addition, the memory 130 may include a plurality of configurations (or modules) comprising the dialogue system as illustrated in FIG. 3, which will be described in greater detail with reference to FIG. 3.

In addition, the memory 130 may include a plurality of artificial intelligence models (or neural network models) with respect to each of the modules for providing a response to the user speech. For example, the memory 130 may include a plurality of wake-up models, a plurality of speech recognition models, a plurality of natural language understanding models, a plurality of natural language generating models, a plurality of TTS models, and the like.

The processor 140 may be electrically coupled with the memory 130 and control the overall operation of the electronic apparatus 100. Specifically, the processor 140 may, by executing at least one instruction stored in the memory 130, obtain a user image by photographing the user through the camera 110, obtain a user information based on the user image, and based on a user speech being input from the user through the microphone 120, recognize the user speech by using a speech recognition model corresponding to the user information of the plurality of speech recognition models.

Specifically, the processor 140 may obtain the user information by analyzing the user image. In an embodiment, the processor 140 may obtain user information by inputting the obtained user image to the object recognition model, which is trained to obtain information on an object included in the image, and may obtain the user information by comparing the user image on at least one user pre-registered in the memory 130 and the user image obtained by the camera 110.

The processor 140 may perform preprocessing on the speech signal. Specifically, the processor 140 may obtain not only the user information but also an environment information based on information on an object other than the user included in the user image by analyzing the user image, and may perform preprocessing on the speech signal included with the user speech based on the environment information and the user information. Specifically, the processor 140 may perform preprocessing by identifying a preprocessing filter to remove noise included in the speech signal based on the environment information, and may perform preprocessing by identifying a parameter for enhancing user speech included in the speech signal based on the user information.

The processor 140 may identify whether a wake-up word is included in the user speech based on the wake-up model corresponding to the user information of the plurality of wake-up models. If the wake-up word is included in the user speech, the processor may execute a dialogue system based on the wake-up word.

In addition, the processor 140 may identify a language model and an acoustic model corresponding to the user information, and obtain a text data on the user speech by using the identified language model and the acoustic model. The processor 140 may then identify one of the plurality of natural language understanding models based on the user information, and perform a natural language understanding on the text data obtained through the identified natural language understanding model. The processor 140 may obtain a response information on the user speech based on a result of the natural language understanding, and output a response speech on the user by inputting the response information to the TTS model corresponding to the user speech of the plurality of TTS models. The processor 140 may identify an output method (e.g., an auditory output method or a visual output method) on the response information based on the user information.

Specifically, a function related to the artificial intelligence according to the disclosure may be operated through the processor 140 and the memory 130. The processor 140 may be configured as one or a plurality of processors. The one or plurality of processors may be a generic-purpose processor such as, for example, and without limitation, a CPU, an AP, a digital signal processor (DSP), or the like, a graphics dedicated processor such as, for example, and without limitation, a GPU, a vision processing unit (VPU), or the like, or an AI dedicated processor such as, for example, and without limitation, an NPU. The one or plurality of processors may control to process the input data through a pre-defined operation rule or an artificial intelligence model stored in the memory 130. Alternatively, if the one or plurality of processors is an AI dedicated processor, the AI dedicated processor may be designed to a hardware structure specializing in the processing of a specific artificial intelligence model.

The pre-defined operation rule or artificial intelligence model is characterized by being generated through learning. Here, being generated through learning refers to a pre-defined operation rule or an artificial intelligence model set to perform a desired feature (or, object) being generated as a basic artificial intelligence model is trained by a learning algorithm using a plurality of training data. The learning may be carried out in the device in which the artificial intelligence according to the disclosure is performed on its own, or carried out through a separate server and/or system. Examples of the learning algorithm may include a supervised learning, an unsupervised learning, a semi-supervised learning, or a reinforcement learning, but the embodiment is not limited thereto.

The artificial intelligence model may be comprised of a plurality of neural network layers. Each of the plurality of neural network layers may include a plurality of weighted values, and perform a neural network processing through a processing result of a previous layer and the processing between a plurality of weighted values. The plurality of weight values included in the plurality of network layers may be optimized by the learning result of the artificial intelligence model. For example, the plurality of weight values may be updated so that a loss value or a cost value obtained by the artificial intelligence model during the learning process is reduced or minimized. The artificial neural network may include a Deep Neural Network (DNN), and other examples may include, for example, a Convolutional Neural Network (CNN), a Deep Neural Network (DNN), a Recurrent Neural Network (RNN), a Restricted Boltzmann Machine (RBM), a Deep Belief Network (DBN), a Bidirectional Recurrent Deep Neural Network (BRNDD), a Deep Q-Networks, or the like, but the embodiment is not limited thereto.

The linguistic understanding may, as a technique for recognizing and applying/processing the language/characters of humans, include natural language processing, machine translation, dialogue system, question answering, speech recognition/synthesis, and the like.

FIG. 3 is a drawing illustrating a block diagram comprising a configuration for providing a response to a user speech according to an embodiment of the disclosure.

Referring to FIG. 3, the configurations may be a configuration for performing a dialogue with a virtual artificial intelligence agent through a natural language or controlling the electronic apparatus 100, and the electronic apparatus 100 may include an object recognition module 310, a preprocessing module 320, a dialogue system 330, and an output module 340. The dialogue system 330 may be included with a wake-up word recognition module 331, a speech recognition module 332, a natural language understanding module 333, a dialogue manager module 334, a natural language generating module 335, and a TTS module 336. According to an embodiment, the modules included in the dialogue system 330 may be stored in the memory 130 of the electronic apparatus 100, but this is merely one embodiment, and may be implemented as a combined form of a hardware and a software. In addition, the at least one module included in the dialogue system 330 may be included in at least one external server.

The object recognition module 310 may obtain information on the user and the object included in the user image photographed through the camera 110 by using the object recognition model trained to recognize the object. Specifically, the object recognition module 310 may obtain the age group, gender, whether or not there is disability, physical information, and the like of the user included in the user image through the object recognition model. In addition to the above, the object recognition module 310 may obtain information on the object included in the user image through the object recognition model, and obtain the environment information based on the information on the object. For example, the object recognition module 310 may obtain information on a place the user is located based on the information on the object, information on the object that generates noise around the user, and the like.

The preprocessing module 320 may perform preprocessing on an audio signal received through the microphone 120. Specifically, the preprocessing module 320 may receive an audio signal in an analog form including the user speech through the microphone, and may convert the analog signal to a digital signal. The preprocessing module 320 may then extract a user speech section by calculating an energy of the converted digital signal.

Specifically, the preprocessing module 320 may identify whether an energy of the digital signal is greater than or equal to a pre-set value. If the energy of the digital signal is greater than or equal to a pre-set value, the preprocessing module 320 may either remove noise on the input digital signal or enhance user speech by identifying as the speech section, or if the energy of the digital signal is less than or equal to a pre-set value, the preprocessing module 320 may not perform signal processing on the input digital signal and may wait for another input. Accordingly, unnecessary power consumption may be prevented because the audio processing process as a whole is not activated by a sound that is not the user speech.

The preprocessing module 320 may perform preprocessing which performs filtering on the audio signal including the user speech based on the environment information, and preprocessing for enhancing the audio signal including the user speech based on the user information. Specifically, the preprocessing module 320 may select a filtering parameter corresponding to a place information the user is currently located of a plurality of filtering parameters, and perform a filtering operation based on the selected filtering parameter. The electronic apparatus 100 may perform the filtering operation by using the different filtering parameters according to whether the place the user is currently located is the kitchen, the living-room, the bathroom. In addition, the preprocessing module 320 may select an enhancing parameter corresponding to the current user information, and perform the enhancement preprocessing on the user speech by using the selected enhancement parameter. In an example, if the user is a child, the preprocessing module 320 may perform the enhancement preprocessing on the user speech by using the enhancement parameter which enhances a high-pitch range of the user speech. In another example, if the user is an adult male, the preprocessing module 320 may perform enhancement preprocessing on the user speech by using the enhancement parameter which enhances a low-pitch range of the user speech.

The wake-up word recognition module 331 may identify whether the wake-up word is included in the user speech through the wake-up model. The wake-up word (or trigger word) may be a command (e.g., Bixby, Galaxy) indicating that the user has started the speech recognition. So, the electronic apparatus 100 may execute the dialogue system in response to the wake-up word being input. The wake-up word may be pre-set at the time of manufacture, but this is merely one embodiment, and may be changed according to user setting. The wake-up word recognition module 331 may include a plurality of wake-up models trained for each user characteristic. The wake-up word recognition module 331 may then identify whether the wake-up word is included in the user speech by using a wake-up model corresponding to the user information of the plurality of wake-up models.

The speech recognition module 332 may convert the user speech in the form of an audio data received from the preprocessing module 320. The speech recognition module 221 may include a plurality of speech recognition models trained for each user characteristic, and each of the plurality of speech recognition models may include an acoustic model and a language model. The acoustic model may include information associated with vocalization and the language model may include information on unit phoneme information and information on a combination of unit phoneme information. The speech recognition module 332 may convert the user speech to text data by using information associated with vocalization and information on unit phoneme information. The information on the acoustic model and the language model may, for example, be stored in an automatic speech recognition database (ASR DB). Specifically, the speech recognition module 332 may include a plurality of language models and acoustic models trained for each of the plurality of user characteristics (e.g., age group, gender, etc.). For example, the speech recognition module 332 may be a first language model trained with a corpus including words frequently used by children, and a second language model trained with a corpus including words frequently used by adults. In another example, the speech recognition module 332 may include a first acoustic model trained with a voice of a child, and a second acoustic model trained with a voice of an adult.

The speech recognition module 332 may perform speech recognition on the user speech by using a speech recognition model corresponding to user information of the plurality of speech recognition models. For example, if the user is identified as a child based on the user information, the speech recognition module 332 may perform speech recognition on the user speech by using a first language model trained with a corpus including words frequently used by the child and a first acoustic model trained through the voice of the child.

The natural language understanding module 333 may identify a domain and a user intent on the user speech by performing a syntactic analysis or a semantic analysis based on the text data on the user speech obtained through speech recognition. The syntactic analysis divides the user input into syntactic units (e.g., word, phrase, morpheme, etc.), and identify which syntactic elements the divided units include. The semantic analysis may be performed by using sematic matching, rule matching, formula matching and the like.

The natural language understanding module 333 may include a plurality of natural language understanding models trained by each user characteristic, and may perform natural language understanding based on the natural language understanding model corresponding to the user information of the plurality of natural language understanding models. For example, if the user is identified as a child based on the user information, the natural language understanding module 333 may obtain a natural language understanding on the user speech by using the natural language understanding model trained based on the text frequently used by the child.

The natural language understanding module 333 may obtain the natural language understanding result, category of user speech, intent of user speech, and a slot (or, entity, parameter, etc.) for performing the intent of the user speech.

The dialogue manager module 334 may obtain a response information on the user speech based on the user intent and slot obtained in the natural language understanding module 333. The dialogue manager module 334 may provide a response on the user speech based on the knowledge DB. The knowledge DB may be included in the electronic apparatus 100, but this is merely one embodiment, and may be included in an external server. In addition, the dialogue manager module 334 may include a plurality of knowledge DB for each user characteristic, and obtain a response information on the user speech by using the knowledge DB corresponding to the user information of the plurality of knowledge DB. For example, if the user is identified as a child based on the user information, the dialogue manager module 334 may obtain a response information on the user speech by using the knowledge DB corresponding to the child.

In addition, the dialogue manager module 334 may identify whether the user intent identified by the natural language understanding module 333 is clear. For example, the dialogue manager module 334 may identify whether the user intent is clear based on whether there is sufficient information on the slot. In addition, the dialogue manager module 334 may identify whether the slot identified in the natural language understanding module 333 is sufficient for performing a task. According to an embodiment, the dialogue manager module 334 may perform feedback requesting necessary information to the user if the user intent is not clear.

The natural language generating module 335 may change the response information or designated information obtained through the dialogue manager module 334 to a text form. The information changed to the text form may be in the form of a natural language utterance. The designated information may, for example, be information on additional input, information guiding a completion of operation corresponding to the user input, or information (e.g., feedback information on user input) guiding for an additional input by the user. The information changed to the text form may be displayed on a display of the electronic apparatus 100 or changed to a speech form by the TTS module 336.

The natural language generating module 335 may also include a plurality of natural language generating models trained to generate a natural language for each user characteristic or a plurality of natural language templates generated for each user characteristic. The natural language generating module 335 may generate a response on the user speech in a natural language form by using a natural language generating model (or a natural language template corresponding to user information of a plurality of natural language generating models) corresponding to the user information of the plurality of natural language generating models. For example, if the user is identified as a child based on the user information, the natural language generating module 335 may generate a response on the user speech as a natural language by using the natural language generating model or the natural language template corresponding to the child.

The TTS module 336 may change the information in the text form to an information in a speech form. The TTS module 336 may include a plurality of TTS models for generating a response in various voices, and the TTS module 336 may obtain a response speech in speech form by using the TTS model corresponding to the user information of the plurality of TTS models. For example, if the user is identified as a child based on the user information, the TTS module 336 may obtain a response speech by using the TTS model (e.g., a TTS model for generating a voice of an animation character favored by the child) corresponding to the child.

The output module 340 may output information in a form of a speech data received from the TTS module 336. The output module 340 may output information in the form of speech data through the speaker or a speech output terminal. Alternatively, the output module 340 may output information in the form of text data obtained through the natural language generating module 335 through the display or an image output terminal.

FIG. 4 is a diagram illustrating a method for providing a user speech by obtaining a user information based on a user image and selecting a model of a dialogue system based on the obtained user information according to an embodiment of the disclosure.

Referring to FIG. 4, first, the electronic apparatus 100 may obtain a user image at operation S410. The electronic apparatus 100 may obtain the user image through the camera 110, but this is merely one embodiment, and may receive the user image from an external apparatus including a camera.

The electronic apparatus 100 may obtain the user information and the environment information by analyzing the user image at operation S420. Specifically, the electronic apparatus 100 may obtain the user information based on the user image. In an embodiment, the electronic apparatus 100 may identify whether the user is a registered user by comparing a characteristic area (e.g., iris, face, etc.) of the user included in the user image with a pre-registered image. If identified as the registered user, the electronic apparatus 100 may obtain the user information based on information on the registered user. In another embodiment, the electronic apparatus 100 may obtain the user information included in the user image by inputting the user image to the trained object recognition model. The user information may include the age group, gender, whether or not there is disability, physical information, and the like of the user, but this is merely one embodiment, and may also include other user information. For example, the electronic apparatus 100 may identify that the user is a child by analyzing the user image. In addition, the electronic apparatus 100 may obtain the environment information based on information on another object included in the user image. The electronic apparatus 100 may obtain information on the object included in the user image by inputting the user image to the trained object recognition model, and obtain the environment information of the environment the user is located based on information on the obtained object. For example, the electronic apparatus 100 may identify that the place the user is located is a shop by analyzing the user image. That is, the electronic apparatus 100 may obtain information on the shop as information on the place the user is located.

The electronic apparatus 100 may receive input of the user speech at operation S430. The user speech may be in a speech data form, and may include at least one of the wake-up word, the text for inquiring information, and the text for controlling the electronic apparatus. For example, the input user speech may be, "Retail-bot, which are the most sold smart phones?"

The electronic apparatus 100 may perform preprocessing on the input user speech at operation S440. The electronic apparatus 100 may perform preprocessing by identifying a parameter which enhances the user speech based on the obtained user information. In addition, the electronic apparatus 100 may perform preprocessing by identifying a parameter for filtering an external noise based on the obtained environment information. For example, if the user is a child, the electronic apparatus 100 may perform preprocessing on the user speech by identifying a parameter for enhancing a high-pitch range. In addition, if the place the user is located is a shop, the electronic apparatus 100 may perform preprocessing on the audio signal which includes the user speech by identifying a filter for removing the noise generated in the shop.

The electronic apparatus 100 may recognize the wake-up word in the obtained speech at operation S450. The wake-up word may be a word for executing the dialogue system, and may be a word such as, for example, "retail-bot." Specifically, the electronic apparatus 100 may recognize the wake-up word based on the wake-up model corresponding to the user information of the plurality of wake-up models capable of recognizing the wake-up word for each user characteristic.

The electronic apparatus 100 may perform speech recognition at operation S460. The electronic apparatus may obtain the text data corresponding to the user speech by performing speech recognition based on the speech recognition model. Specifically, the electronic apparatus 100 may obtain the text data corresponding to the user speech based on the speech recognition model corresponding to the user information of the plurality of speech recognition models trained for each user characteristic.

The electronic apparatus 100 may perform the natural language understanding at operation S470. The electronic apparatus 100 may identify the category, intent and slot of the user speech by performing a natural language understanding on the text data based on the natural language understanding model. Specifically, the electronic apparatus 100 may obtain the category, intent, slot and the like corresponding to the user speech based on the natural language understanding model corresponding to the user information of the plurality of natural language understanding models trained for each user characteristic. For example, if the text data is "which are the most sold smart phones?" the electronic apparatus 100 may obtain "search" as the user intent, and "mobile phone" and "most sold" as the information on the slot through the natural language understanding model.

The electronic apparatus 100 may obtain the response information at operation S480. The electronic apparatus 100 may obtain the response information based on the intent and slot of the user speech obtained based on the natural language understanding. The electronic apparatus 100 may obtain the response information by using the knowledge DB corresponding to the user information of the plurality of knowledge DB stored in the electronic apparatus 100. Alternatively, the electronic apparatus 100 may transmit the intent and slot of the user speech and the user information to the external server, and receive the response information obtained based on the transmitted intent and slot of the user speech and the user information. For example, if the user is a child, the electronic apparatus 100 may obtain the response information by using the knowledge DB on kids-phones.

The electronic apparatus 100 may generate the natural language by using the response information at operation S490. The electronic apparatus 100 may generate a response in the form of a natural language by inputting the response information to the natural language generating model or the natural language template. The electronic apparatus 100 may generate a response in the form of a natural language by using the natural language generating model corresponding to the user information of the plurality of natural language generating models trained for each user characteristic. Alternatively, the electronic apparatus 100 may generate a response in the form of a natural language by using the natural language template corresponding to the user information of the plurality of natural language templates pre-registered for each user characteristic. For example, if the user is a child, the electronic apparatus 100 may generate a response in the form of a natural language by using the natural language generating model or the natural language template corresponding to the child.

The electronic apparatus 100 may synthesize the speech on the generated natural language at operation S495. The electronic apparatus 100 may process the response in the form of a natural language generated by using the TTS model to a response speech in the form of a speech data. The electronic apparatus 100 may obtain the response speech by using the TTS model corresponding to the user information of the plurality of TTS models trained for each user characteristic. For example, if the user is a child, the electronic apparatus 100 may obtain the response speech by using the TTS model capable of generating the speech of the animation character favored by the child.

The electronic apparatus 100 may output the response at operation S497. The electronic apparatus 100 may identify an output method on the response information based on the user information. The output method on the response information may include a method of outputting the response information through the display and a method of outputting the response information through the speaker. For example, if the user is a child, the electronic apparatus 100 may output the response information by using both the method of outputting the response information through the display and the method of outputting the response information through the speaker, and if the user is an adult, the electronic apparatus 100 may output the response information by using the method of outputting the response information through the speaker. In addition, the electronic apparatus 100 may output the response information to different output states based on the user information.

Figure 5A:
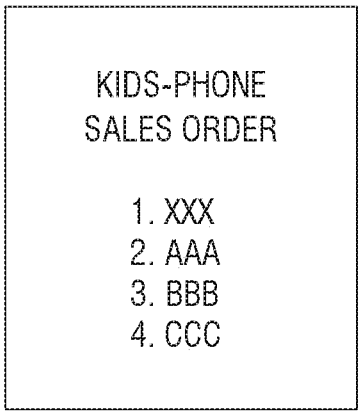
FIGS. 5A and 5B are diagrams illustrating an embodiment of providing a response by different methods based on an age group of a user according to various embodiments of the disclosure.
Figure 5B:
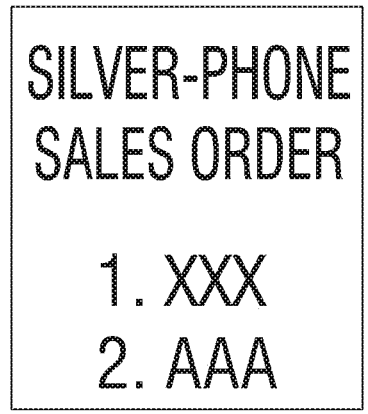

FIGS. 5A and 5B are diagrams illustrating an embodiment of providing a response by different methods based on an age group of a user according to various embodiments of the disclosure.

Referring to FIGS. 5A and 5B, for example, if the user is a child, the electronic apparatus 100 may output the response information to a size of a first character, and if the user is a senior, the electronic apparatus 100 may output the response information to a size of a second character, which is larger than the size of the first character.

Figure 6:
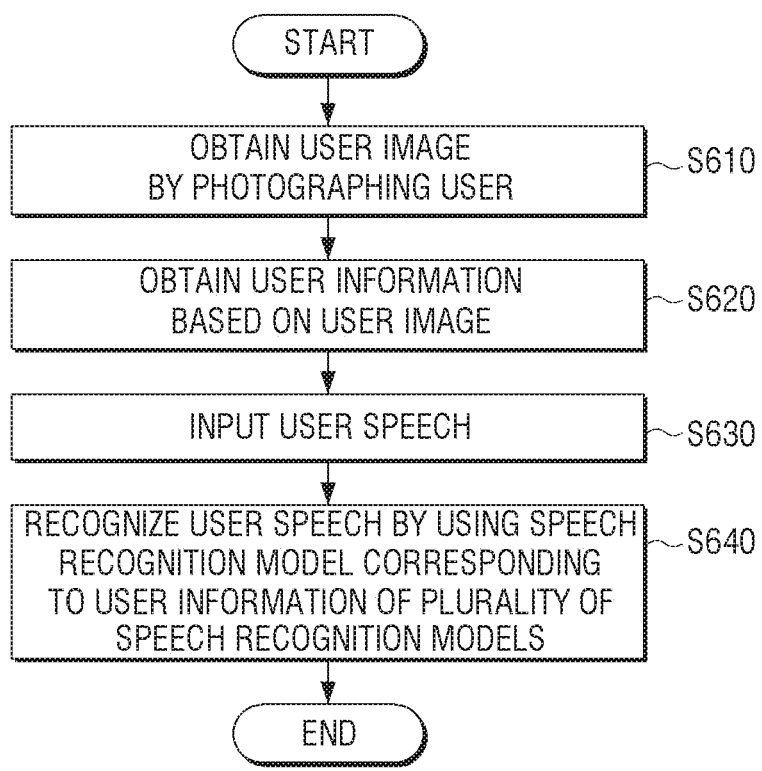
FIG. 6 is a flowchart illustrating a control method of an electronic apparatus according to an embodiment of the disclosure.

FIG. 6 is a flowchart illustrating a control method of an electronic apparatus according to an embodiment of the disclosure.

Referring to FIG. 6, the electronic apparatus 100 may obtain the user image by photographing the user at operation S610.

The electronic apparatus 100 may obtain the user information based on the user image at operation S620. The electronic apparatus may obtain the user information by inputting the user image to the trained object recognition model, and obtain the user information by identifying whether the photographed user is a pre-registered user based on the user image.

The electronic apparatus 100 may receive input of the user speech at operation S630.

At operation S640, the electronic apparatus 100 may recognize the user speech by using the speech recognition model corresponding to the user information of the plurality of speech recognition models. That is, the electronic apparatus 100 may further raise the accuracy on speech recognition by recognizing the user speech based on the speech recognition model corresponding to the user information obtained by analyzing the image from the plurality of speech recognition models trained for each user characteristic.

In the above-described embodiment, the electronic apparatus 100 has been described as comprising all configurations, but this is merely one embodiment, and some configurations of the dialogue system may be included in the external server.

Figure 7:
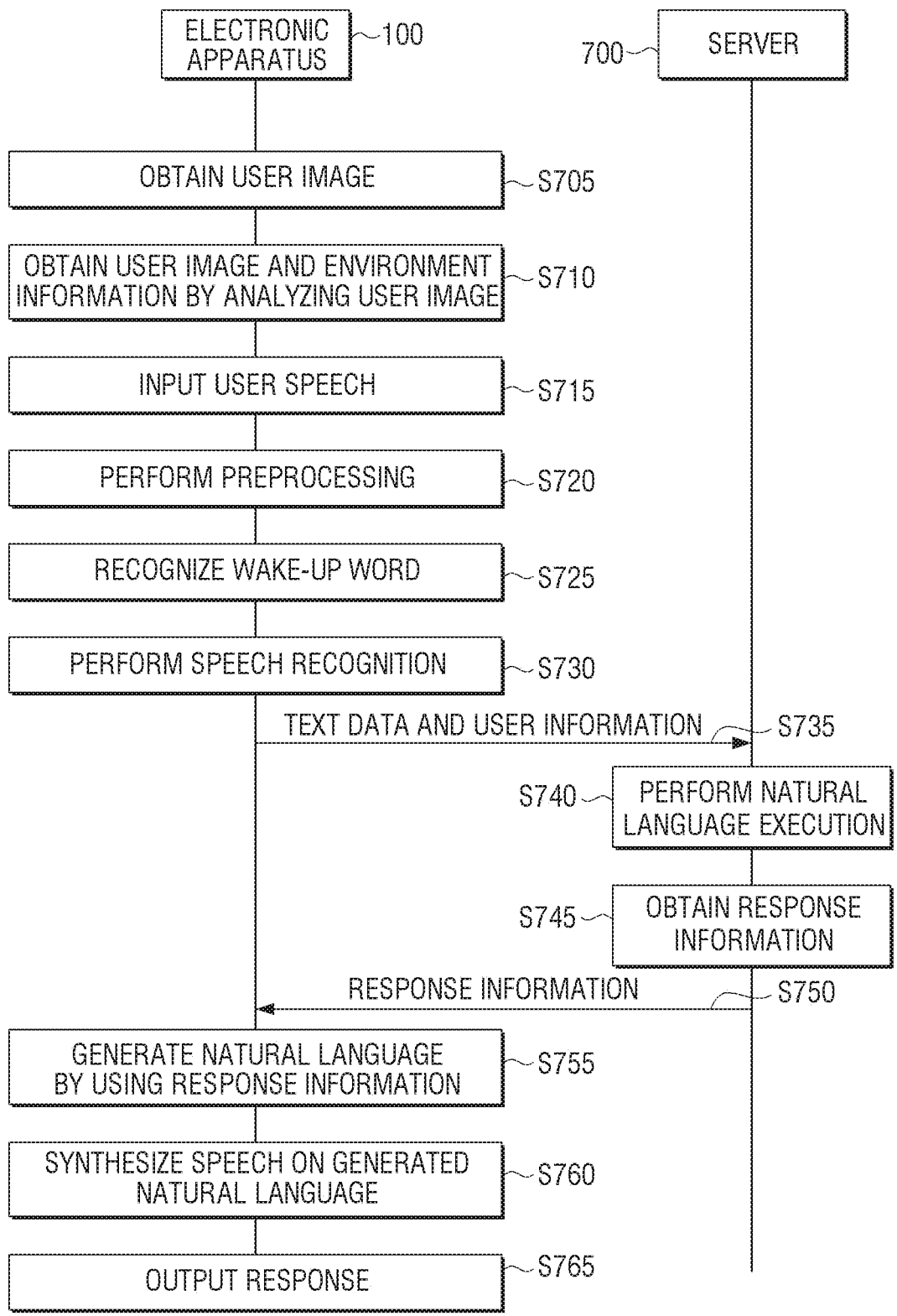
FIG. 7 is a sequence diagram illustrating an electronic apparatus in association with a server providing a response to a user according to an embodiment of the disclosure.

FIG. 7 is a sequence diagram illustrating an electronic apparatus in association with a server providing a response to a user according to an embodiment of the disclosure. Meanwhile, operations S705 to S730 illustrated in FIG. 7 overlap with operations S410 to S460 described in FIG. 4 and thus, a detailed description thereof will be omitted.

Referring to FIG. 7, the electronic apparatus 100 may transmit the obtained text data and the user information to the server 700 at operation S735.

The server 700 may perform the natural language understanding based on the obtained text data and the user information at operation S740. Specifically, the server 700 may obtain the category, intent, slot, and the like corresponding to the user speech based on the natural language understanding model corresponding to the user information of the plurality of natural language understanding models trained for each user characteristic.

The server 700 may obtain the response information at operation S745. Specifically, the server 700 may obtain the response information based on the intent and slot of the user speech obtained based on the natural language understanding. The server 700 may obtain the response information by using the knowledge DB corresponding to the user information of the plurality of knowledge DB. The server 700 may obtain the plurality of response information for each of the plurality of output methods based on the user information. For example, if the user is a child, the server 700 may obtain the response information provided through the display and the response information provided through the speaker.

The server 700 may transmit the obtained response information to the electronic apparatus 100 at operation S750. The server 700 may transmit the information on the output method of the response information together with the response information thereto.

The electronic apparatus 100 may generate the natural language by using the received response information at operation S755. The electronic apparatus 100 may generate a response in the form of a natural language by using the natural language generating model corresponding to the user information of the plurality of natural language generating models trained for each user characteristic. Alternatively, the electronic apparatus 100 may generate a response in the form of a natural language by using the natural language template corresponding to the user information of the plurality of natural language templates pre-registered for each user characteristic.

The electronic apparatus 100 may synthesize the speech on the generated natural language at operation S760. The electronic apparatus 100 may obtain the response speech by using the TTS model corresponding to the user information of the plurality of TTS models trained for each user characteristic. For example, if the user is a child, the electronic apparatus 100 may obtain the response speech by using the TTS model capable of generating the speech of the animation character favored by the child.

The electronic apparatus 100 may output the response at operation S765. Specifically, the electronic apparatus 100 may output the response information based on the output method of the response information received from the server 700.

In the above-described embodiment, the natural language understanding module and the dialogue manager module of the dialogue system has been described as being included in the server 700, but this is merely one embodiment. Further, other configurations (e.g., speech recognition module and natural language generating module) may be included in the server, and some configurations (e.g., one of the natural language understanding module or the dialogue manager module) may also be included in the electronic apparatus.

Figure 8:
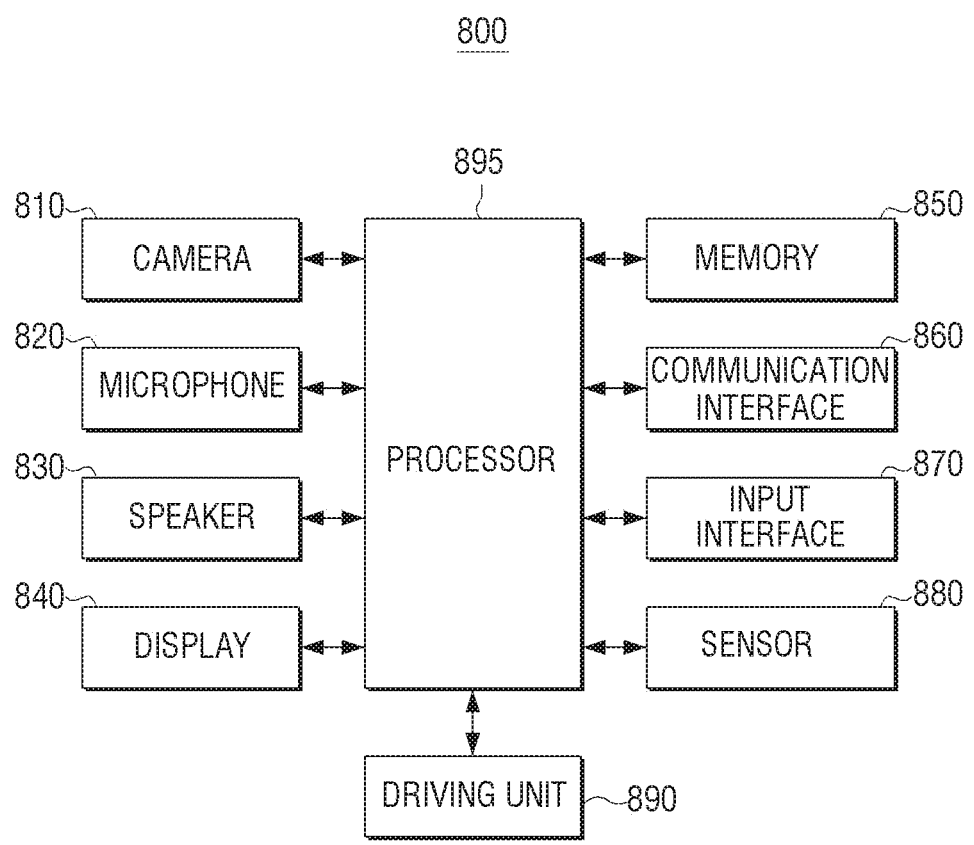
FIG. 8 is a drawing of a block diagram illustrating in detail a configuration of an electronic apparatus according to an embodiment of the disclosure.

FIG. 8 is a drawing of a block diagram illustrating in detail a configuration of an electronic apparatus according to an embodiment of the disclosure.

Referring to FIG. 8, the electronic apparatus 800 may be implemented as a robot capable of movement, and the electronic apparatus 800 may include a camera 810, a microphone 820, a speaker 830, a display 840, a memory 850, a communication interface 860, an input interface 870, a sensor 880, a driving unit 890, and a processor 895. Because the camera 810, the microphone 820, the memory 850, and the processor 895 illustrated in FIG. 8 overlap with the camera 110, the microphone 120, the memory 130, and the processor 140 described in FIG. 2, the redundant descriptions will be omitted. In addition, according to an embodiment of the electronic apparatus 800, some of the configurations of FIG. 8 may be removed or other configurations may be added.

The speaker 830 may be a configuration for the electronic apparatus 800 to audibly provide information. The electronic apparatus 800 may include one or more speakers 830, and may output a response on the input user speech, an inquiry on the user speech, alarm information, and the like as an audio signal through the speaker 830. The configuration for outputting the audio signal may be implemented as the speaker 830, but this is merely one embodiment, and may be implemented as an output terminal.

The display 840 may be a configuration for the electronic apparatus 800 to visually provide information. The electronic apparatus 800 may include one or more displays 840, and display a response on the input user speech, inquiry on the user speech, alarm information, and the like through the display 840. The display 840 may be implemented as a liquid crystal display (LCD), a plasma display panel (PDP), an organic light emitting diodes (OLED), transparent OLED (TOLED), a micro LED, and the like. In addition, the display 840 may be implemented in the form of a touch screen capable of detecting a touch operation of the user, and may also be implemented as a flexible display which may be folded or bent.

The communication interface 860 may be a configuration which is capable of performing communication with the external apparatus. The communication interface 860 communicatively coupling with the external apparatus may include communicating through a third device (e.g., relay, hub, access point, server, gateway, or the like). The wireless communication may include a cellular communication which uses at least one of, for example, an long term evolution (LTE), an LTE advance (LTE-A), a code division multiple access (CDMA), a wideband CDMA (WCDMA), a universal mobile telecommunications system (UNITS), a wireless broadband (WiBro), or a global system for mobile communications (GSM). According to an embodiment, the wireless communication may include at least one of, for example, wireless fidelity (WiFi), Bluetooth, Bluetooth low energy (BLE), ZigBee, near field communication (NFC), magnetic secure transmission, radio frequency (RF) or body area network (BAN). The wired communication may include at least one of, for example, a universal serial bus (USB), a high definition multimedia interface (HDMI), a recommended standard 232 (RS-232), a power line communication (PLC), or plain old telephone service (POTS). A network in which the wireless communication or the wired communication is performed may include a telecommunication network, for example, at least one of a computer network (e.g., local area network (LAN) or wide area network (WAN)), the Internet, or a telephone network.

The communication interface 860 may provide the dialogue system service by performing communication with an external server. Specifically, the communication interface 860 may transmit the user speech (or the text corresponding to the user speech) to the external server, and receive the response information on the user speech from the external server.

Alternatively, the communication interface 860 may receive the user image or the user speech from the external apparatus which includes the camera, the microphone, and the like, and provide the user with the received user image or the user speech by transmitting the response information on the user speech to the external apparatus which includes the speaker or the display.

The input interface 870 may be a configuration for receiving user input to control the electronic apparatus 800. For example, the input interface 870 may be implemented as a touch panel, a button, a dial, and the like to receive input of a user touch to control the electronic apparatus 800, but this is merely one embodiment, and may be implemented as an input apparatus such as a keyboard and a mouse.

The sensor 880 may be a configuration for detecting information of a surrounding state of the electronic apparatus 800. Specifically, the sensor 880 may include a proximity sensor for detecting the proximity to the user or the object, a gyro sensor for obtaining movement information, an acceleration sensor, and the like, and may include a sensor for obtaining biometric information of a user and a sensor for obtaining information (e.g., temperature, humidity, etc.) on a space the electronic apparatus 800 is located.

The driving unit 890 may be a configuration for moving the electronic apparatus 800. Specifically, the driving unit 890 may include an actuator for driving of the electronic apparatus 800. In addition, the actuator for driving the motion of other physical configurations (e.g., arm, etc.) of the electronic apparatus 800 may be included in addition to the driving unit 890. For example, the electronic apparatus 800 may control the actuator to travel or move in a direction of the user detected through the sensor 880.

As described above, according to an embodiment, because the electronic apparatus provides a response on the user speech by selecting the speech recognition corresponding to the user information and the neural network model for the natural language understanding, usability of the electronic apparatus may be greatly improved for being able to provide a response suitable to the user characteristic.

One or more embodiments may be implemented with software including instructions stored in a machine-readable storage media (e.g., computer). The machine may call an instruction stored in the storage medium, and as an apparatus capable of operating according to the called instruction, may include an electronic apparatus (e.g., electronic apparatus 100) according to embodiments. Based on the instruction being executed by the processor, the processor may directly or under the control of the processor perform a function corresponding to the instruction using different elements.

The instructions may include a code generated by a compiler or executed by an interpreter. The machine-readable storage media may be provided in the form of a non-transitory storage medium. Herein, "non-transitory" merely means that the storage medium is tangible and does not include a signal and does not distinguish that data is permanently or temporarily stored in the storage medium. For example, the 'non-transitory storage medium' may include a buffer in which data is temporarily stored.

According to an embodiment, a method according to one or more embodiments may be provided in a computer program product. The computer program product may be exchanged between a seller and a purchaser as a commodity. The computer program product (e.g., downloadable app) may be distributed in the form of a machine-readable storage medium (e.g., a compact disc read only memory (CD-ROM)) or distributed online through an application store (e.g., PLAYSTORE™). In the case of online distribution, at least a portion of the computer program product may be at least stored temporarily in a storage medium such as a manufacturer's server, a server of an application store, or a memory of a relay server, or temporarily generated.

Each of the elements (e.g., a module or a program) according to various embodiments may be comprised of a single entity or a plurality of entities, and some sub-elements of the abovementioned sub-elements may be omitted, or different sub-elements may be further included in various embodiments. Alternatively or additionally, some elements (e.g., modules or programs) may be integrated into one entity to perform the same or similar functions performed by each respective element prior to integration. Operations performed by a module, program, or other element, in accordance with various embodiments, may be performed sequentially, in a parallel, repetitive, or heuristically manner, or at least some operations may be performed in a different order, omitted or a different operation may be added.

While the disclosure has been shown described with reference to various embodiments thereof, it will be understood by those skilled in the art that various changes in form and details may be made therein without departing from the spirit and scope of the disclosure as defined by the appended claims and their equivalents.

What is claimed is:

1. An electronic apparatus, comprising:
   a microphone;
   a camera;
   a memory storing an instruction and a plurality of wake-up models; and
   a processor configured to control the electronic apparatus and being coupled with the microphone, the camera and the memory,
   wherein the processor, by executing the instruction, is further configured to:
   obtain a user image by photographing a user through the camera,
   obtain user information based on the user image,
   identify a language model and an acoustic model corresponding to the user information,
   identify a natural language understanding model of a plurality of natural language understanding models based on the user information,
   obtain environment information based on information on an object other than the user comprised in the user image by analyzing the user image,
   based on a user speech being input from the user through the microphone, recognize the user speech by using a speech recognition model, among a plurality of speech recognition models, corresponding to the user information,
obtain text data on the user speech by using the identified language model and the acoustic model,
perform a natural language understanding on the obtained text data through the identified natural language understanding model,
perform preprocessing on a speech signal comprising the user speech based on the environment information and the user information,
obtain response information on the user speech based on a result of the natural language understanding,
output a response speech on the user by inputting the response information to a text to speech (TTS) model corresponding to the user speech of a plurality of TTS models, and
identify an output method on the response information based on the user information,
wherein the plurality of wake-up models are neural network models capable of recognizing wake-up words, and trained according to user characteristics included in the user information,
wherein the processor, by executing the instruction, is further configured to identify a wake-up word in the user speech based on a wake-up model, of the plurality of wake-up models, corresponding to the user information,
wherein each of the plurality of speech recognition models comprise the language model and the acoustic model, and
wherein the output method on the response information comprises a method of outputting the response information through a display and a method of outputting the response information through a speaker.

2. The electronic apparatus of claim 1, wherein the processor, by executing the instruction, is further configured to:
perform preprocessing by identifying a preprocessing filter for removing noise comprised in the speech signal based on the environment information, and
perform preprocessing by identifying a para meter for enhancing the user speech comprised in the speech signal based on the user information.

3. The electronic apparatus of claim 1, wherein the processor, by executing the instruction, is further configured to obtain the user information by inputting the obtained user image to an object recognition model trained to obtain information on an object comprised in the obtained user image.

4. The electronic apparatus of claim 1,
wherein the memory stores a user image of a registered user matched with registered user information, and
wherein the processor, by executing the instruction, is further configured to obtain the user information by comparing the obtained user image with the user image of the registered user.

5. A control method of an electronic apparatus, the method comprising:
obtaining a user image by photographing a user through a camera;
obtaining user information based on the user image;
identifying a language model and an acoustic model corresponding to the user information;
identifying a natural language understanding model of a plurality of natural language understanding models based on the user information;
obtaining environment information based on information on an object other than the user comprised in the user image by analyzing the user image;
based on a user speech being input from the user through a microphone, recognizing the user speech by using a speech recognition model, among a plurality of speech recognition models, corresponding to the user information;
obtaining text data on the user speech by using the identified language model and the acoustic model;
performing a natural language understanding on the obtained text data through the identified natural language understanding model;
performing preprocessing on a speech signal comprising the user speech based on the environment information and the user information;
obtaining response information on the user speech based on a result of the natural language understanding;
outputting a response speech on the user by inputting the response information to a text to speech (TTS) model corresponding to the user speech of a plurality of TTS models; and
identifying an output method on the response information based on the user information,
wherein the electronic apparatus comprises a plurality of wake-up models, the plurality of wake-up models being neural network models capable of recognizing wake-up words, and being trained according to user characteristics included in the user information,
wherein the method further comprises identifying a wake-up word in the user speech based on a wake-up model, of the plurality of wake-up models, corresponding to the user information,
wherein each of the plurality of speech recognition models comprise the language model and the acoustic model, and
wherein the output method on the response information comprises a method of outputting the response information through a display and a method of outputting the response information through a speaker.

6. The control method of claim 5, wherein the performing of the preprocessing comprises:
performing preprocessing by identifying a preprocessing filter for removing noise comprised in the speech signal based on the environment information; and
performing preprocessing by identifying a parameter for enhancing the user speech comprised in the speech signal based on the user information.

7. The control method of claim 5, wherein the obtaining of the user information comprises obtaining the user information by inputting the obtained user image to an object recognition model trained to obtain information on an object comprised in the obtained user image.

8. The control method of claim 5,
wherein the electronic apparatus matches and stores a user image of a registered user with registered user information, and
wherein the obtaining the user information comprises obtaining the user information by comparing the obtained user image with the user image of the registered user.

* * * * *